(12) United States Patent
Aflitto

(10) Patent No.: US 12,517,017 B1
(45) Date of Patent: Jan. 6, 2026

(54) AIR SAMPLER

(71) Applicant: Nicholas Aflitto, Ithaca, NY (US)

(72) Inventor: Nicholas Aflitto, Ithaca, NY (US)

(*) Notice: Subject to any disclaimer, the term of this patent is extended or adjusted under 35 U.S.C. 154(b) by 0 days.

(21) Appl. No.: 17/397,428

(22) Filed: Aug. 9, 2021

Related U.S. Application Data

(60) Provisional application No. 63/063,301, filed on Aug. 9, 2020.

(51) Int. Cl.
| | | |
|---|---|---|
| *G01N 1/22* | (2006.01) | |
| *G01N 1/24* | (2006.01) | |
| *G01N 33/00* | (2006.01) | |
| *G08B 17/117* | (2006.01) | |

(52) U.S. Cl.
CPC ......... *G01N 1/2273* (2013.01); *G01N 1/2205* (2013.01); *G01N 1/24* (2013.01); *G01N 33/0011* (2013.01); *G01N 33/0047* (2013.01); *G08B 17/117* (2013.01)

(58) Field of Classification Search
CPC ............. G01N 1/2273; G01N 33/0047; G01N 33/0011; G01N 1/2205; G08B 17/117
USPC ........................................................ 73/31.02
See application file for complete search history.

(56) References Cited

U.S. PATENT DOCUMENTS

| | | | | |
|---|---|---|---|---|
| 4,091,674 A | * | 5/1978 | Amey | G01N 1/24 |
| | | | | 73/864.34 |
| 4,170,901 A | * | 10/1979 | Conkle | G01N 1/2273 |
| | | | | 219/535 |
| 4,432,248 A | * | 2/1984 | Lalin | G01N 1/2273 |
| | | | | 73/864.34 |
| 5,333,511 A | * | 8/1994 | Boyum | G01N 1/2273 |
| | | | | 73/863.25 |

(Continued)

FOREIGN PATENT DOCUMENTS

| | | | |
|---|---|---|---|
| WO | WO 02/073161 | 9/2002 | |
| WO | WO-02073161 A1 * | 9/2002 | ........... G01N 1/2273 |

OTHER PUBLICATIONS

LRAPA Portable Sampler, Operations Manual, Sampler Model 3.1, Manual Version 1.0a, Lane Regional Air Pollution Authority, Springfield Oregon, Nov. 1992 (Year: 1992).*

(Continued)

*Primary Examiner* — Stephanie E Bloss
*Assistant Examiner* — Kevin C Butler
(74) *Attorney, Agent, or Firm* — Charles G. Nessler; Steven M. McHugh; Halloran & Sage

(57) ABSTRACT

Apparatus for sampling air or another gas comprises a trap which captures a first constituent of air or gas that is passed through the trap, for example Volatile Organic Compounds (VOC), or the amount of suspended particulate. A first sensor measures, in the air or gas the flows into the trap the amount of first constituent, and or the amount of a second constituent, and or a property of the air or gas, such as (Continued)

temperature or humidity. A second sensor measures, in the air or gas that has flowed through the trap, the amount of first constituent, and or the amount of a third constituent, and or of the air or gas properties. The time period when the pump runs, the pump speed or flow rate, and opening and closing of a valve at the trap inflow end, are determined by comparing first sensor and second sensor signals or by comparing constituent amounts or properties to a predetermined threshold.

8 Claims, 5 Drawing Sheets

(56) References Cited

U.S. PATENT DOCUMENTS

| | | | |
|---|---|---|---|
| 5,892,160 A * | 4/1999 | Hall | G01N 1/2273 |
| | | | 73/863.03 |
| 11,054,347 B1 * | 7/2021 | Gogoana | G01N 1/405 |
| 11,366,057 B2 * | 6/2022 | Scott | G01N 33/0036 |

OTHER PUBLICATIONS

LRAPA Portable Sampler, Operations Manual, Sampler Model 3.1, Manual Version 1.0a, Lane Regional Air Pollution Authority, Springfield Oregon, Nov. 1992, p. 132 (Year: 1992).*

Gilair Plus Operation Manual, (2017), 3 pages, Sensidyne, LP, St. Petersburg, FL 33716.

Escort Elf Pump Instruction Manual (2018), 7 Pages Zefon International Inc, Ocala, FL 34474.

* cited by examiner

AIR SAMPLER

This application claims benefit of provisional patent application Ser. No. 63/063,301 filed Aug. 9, 2020, the disclosure of which is hereby incorporated by reference.

FIELD OF THE INVENTION

The present invention relates to devices and methods for collecting and analyzing constituents in gases, such as volatile organic compounds (VOC) which are present in air.

BACKGROUND OF THE INVENTION

Volatile Organic Compounds (VOC) are airborne chemical compounds that have high vapor pressures at low temperatures. VOC include substances such as light hydrocarbons, aromatics, ketones, nitriles, acrylates, acetates, ethers and sulfides. Total Volatile Organic Compounds (TVOC) refers to a group or pool of VOC There are very many VOC and there is generally a lack of sensors to monitor all of them or continuously.

Due to the strong impact which VOC can have on organisms, there is great interest in detecting and quantifying VOC in a wide range of undertakings, including chemical ecology, atmospheric analysis, food science, medicine, and industrial hygiene particularly human health.

A familiar way of sampling VOC in an air mass is to draw the air through a device commonly called a trap, to capture the VOC which are present. Familiar kinds of absorbent traps include sorbent tubes and filter cassettes. An air mass of interest may be the domain within a sealed laboratory chamber containing an organism that releases VOC, above an open field, in a polluted urban setting, in food and beverage industry facilities and equipment, within the ductwork of an HVAC system, and at a workspace of a person who could be adversely affected.

In familiar portable devices (often referred to as personal air samplers), a small battery powered air pump causes air to flow through a trap. Once a predetermined time has elapsed, or a trap has been thought to have sufficiently absorbed VOC, the trap is removed from the portable device and the captured substances are processed and analyzed in specialized equipment such as a gas chromatography-mass spectrometry (GC-MS) machine. A typical aim is to identify the specific compounds that were absorbed in the trap, and when an internal standard is used, the amount of each compound.

Presently available commercial portable air samplers are relatively basic, bulky tools. Control of their functioning is limited, e.g., to control of the flow rate and the time of sampling. When using present commercial samplers there is no way to know if or when a trap has been fully saturated or failed and is no longer absorbing VOC as intended. There are commercial traps which comprise a "backup section" that is downstream of the primary capture section. If laboratory analysis of the backup section shows no TVOC, then the user would know the primary section had not become saturated. But if the opposite is true, and there was failure or saturation of the primary section during the sampling process, there is no way to know when that happened. Furthermore, the two-section device requires two different analyses of TVOC content, increasing cost and time.

Prior art devices do not acquire nor use information about such as air moisture content, temperature, total volatile organic compounds. For example, humidity and temperature of air are known to have a large impact on the volatility of compounds, which in turn affects the quality of air samples collected.

As an example, a portable device sampling protocol may call for air samples to be taken over several 4 to 8 hour periods, during which there are substantial increments of time when compounds of interest are not present. That effectively adds "noise" to the sample and makes later analysis more difficult and complex. Improvement is required. Prior art portable air samplers are deficient with respect to wireless communication and other data transfer.

There are non-portable air quality monitoring devices that output a score, or a rating, indicative of the level of TVOC (Total Volatile Organic Compounds). They have been integrated into residential and commercial HVAC systems. They provide a coarse understanding of air quality, being unable to differentiate between harmful and benign volatile compounds. Improved portable air samplers may be able to provide enhanced insight by measuring VOC in cooperation with the TVOC scoring devices, allowing identification of harmful and non-harmful substances.

SUMMARY OF THE INVENTION

An object of the invention is to provide a portable air sampler in which the sampling process is carried out in an efficient way, in particular, to make more effective use of a VOC trap or trap that captures another gas constituent. More particularly, an object is to avoid running the pump when meaningful amounts of the capture-constituent are either above or below a threshold; or when other constituents are present, or when the environmental parameters such as temperature or humidity are not favorable for good data acquisition. Another object is to control the unattended operation of a sampler by making the device responsive to different characteristics of the gas or ambient air which is being sampled.

In accord with the invention, an embodiment of apparatus for drawing air or gas into a trap from the ambient atmosphere comprises a trap fitting, a trap removably connected to or positioned within the trap fitting, for capturing a constituent of the air or gas. The amount or character of the constituent is determined in a laboratory when the trap is removed from the apparatus. The constituent being measured may be Volatile Organic Compounds (VOC). A pump causes air to be drawn from the ambient atmosphere or a selected sampling domain and through the pump. A first sensor signals the amount of constituents in the air or gas; for instance, temperature, pressure, humidity and TVOC. A second sensor that is downstream of the trap indicates the amount of one or more such constituents, e.g. TVOC, in the air or gas that flows from the trap. A controller is configured for selectively causing the pump to flow air through the trap responsive to one or both said first sensor signal and said second sensor signal. A power supply powers the components.

In an embodiment, the components are contained within a housing. The apparatus presents as a compact portable device; the trap may be a sorbent tube type device that is received in a tubular fitting set in a wall of the housing; the power supply may be storage battery; and data storage and wireless data communication devices may be within the housing.

In a modification of the foregoing apparatus, there is a valve upstream of the inflow end of the trap for selectively blocking air or gas from entering the inflow end of the trap. That enables the trap of an unattended sampler to be protected from contact with the domain being sampled until a specific time or until a threshold value of air/gas constituent is present. Thus, compared to having a user present, a trap can be preloaded into a portable air sampler which is then left unattended. The sampler is configured to control the time when sampling takes place as a function of predetermined conditions being met in the air or gas being sampled.

In an embodiment of apparatus that captures VOC from air, the pump is caused to flow air through the trap only when the first sensor amount of TVOC in the ambient atmosphere is higher than a predetermined threshold. In another embodiment, the apparatus is configured to stop flowing air when the amount of TVOC indicated by the second sensor (downstream from the trap) is not significantly lower than the amount indicated by the first sensor, which would indicate the trap is no longer functioning to capture VOC. In another embodiment, the flow of air through the trap is reduced when the ambient air has TVOC above a predetermined threshold. An embodiment of the apparatus may alternatively be comprised of a trap which captures particulates.

The apparatus may be compact and portable. The apparatus and method of the present invention better enable acquisition of useful data by only capturing constituents in the trap when conditions in the ambient atmosphere or gas domain are suitable The apparatus enables controlling flow through the trap according to whether or not the trap is saturated or failed.

The foregoing and other objects, features and advantages of the present invention will become more apparent from the following description of preferred and other embodiments and the accompanying drawings.

DESCRIPTION

The disclosure of patent application Ser. No. 63/063,301, filed Aug. 9, 2020, from which benefit is claimed, is hereby incorporated by reference.

The present invention is described below mostly in connection with embodiments that are aimed at sampling ambient atmosphere air to determine VOC, by use of appropriate sensors. The invention will also be useful for sampling and measuring other substances contained within air and other gases, with appropriate sensors. For example, sensors may be used to detect constituents such as carbon dioxide, carbon monoxide, ozone, nitrogen dioxide or fluorocarbon. Gas and vapors may be sensed. As described below, one sensor that may be used is capable of measuring air/gas properties of humidity, temperature and pressure. Air or gas that is sampled may be that from a region or domain that is other than ambient atmosphere. For example, the domain comprising exhaust gas issuing from an internal combustion engine may be sampled. For example, the domain comprising the gases within a laboratory headspace vial or other chemically inert container. As described below, the invention may also be used in connection with capturing suspended solids from air or gas.

Figure 1:
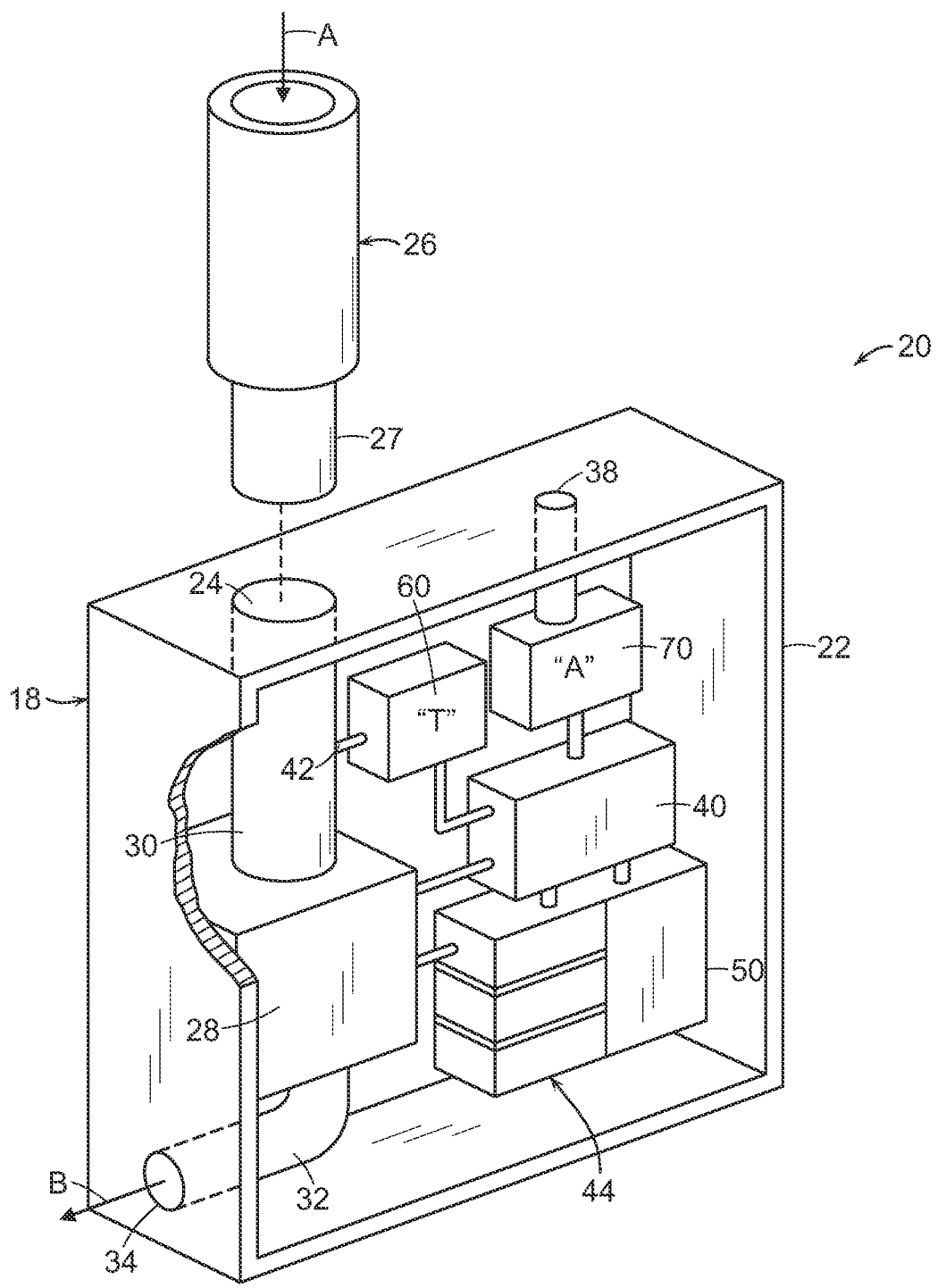
FIG. 1 is a perspective view of a gas sampling system contained for portability within a housing, from which the housing cover removed.
Figure 2:
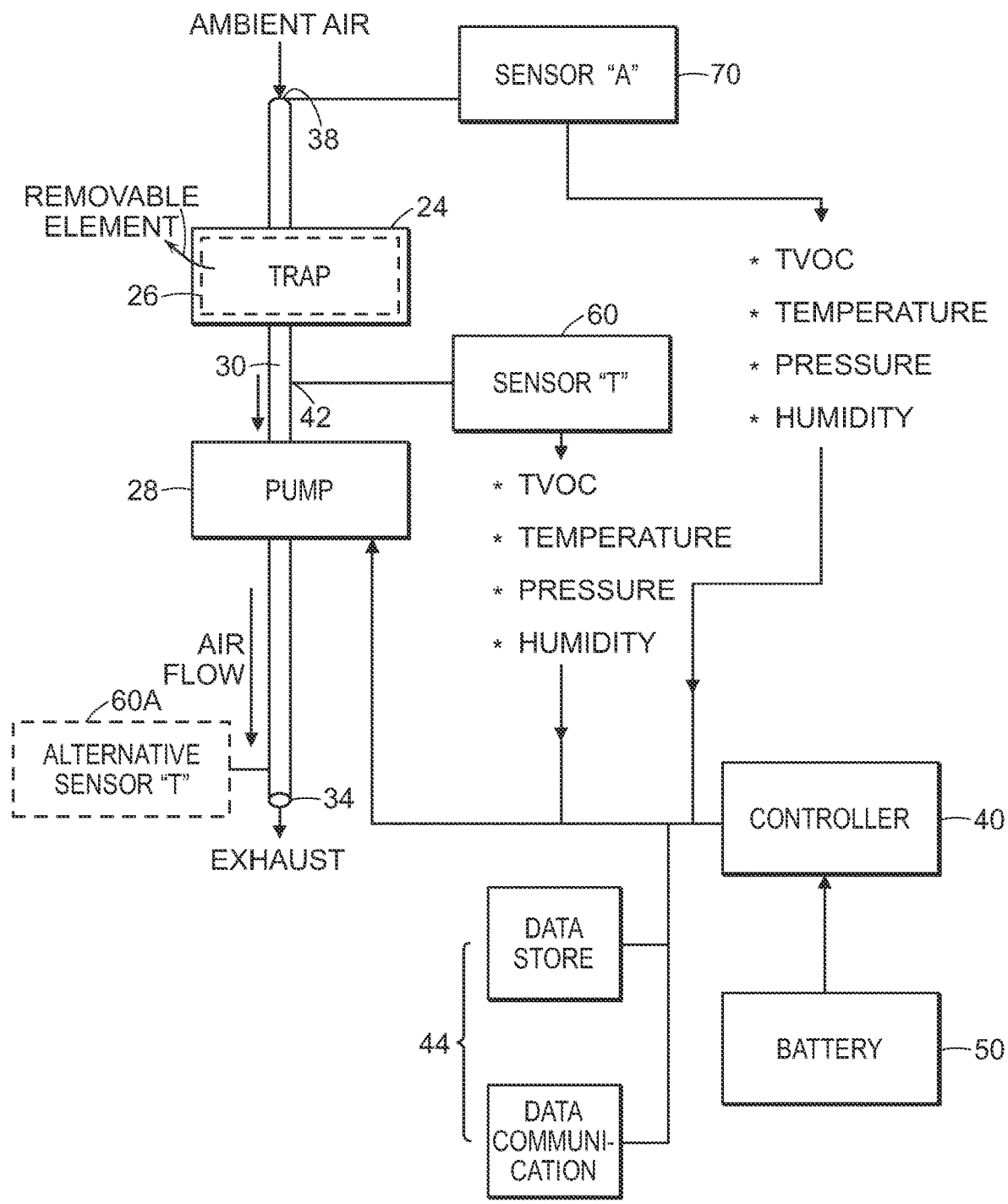
FIG. 2 is schematic diagram showing an embodiment of fluid flow within the air sampler of FIG. 1 along with some of the electric interconnections.

FIG. 1 shows an embodiment of portable air sampler 20 that comprises a rectanguloid box housing 18 which is small enough to enable easy portability. Housing 18 is preferably made of an impact resisting polymer resin. The housing has a multiplicity of walls and is shown with its cover absent, to reveal the internal components. The housing may have other configurations, e.g., a rounded oblong shape. FIG. 2 shows exemplary gas (air) flow amongst the components and some of the electric power, control and data transfer and signaling interconnections. Essentially, apparatus 20 is comprised of a trap 26, a trap fitting 24 for holding the trap, a pump 28 for moving air through the apparatus, a first sensor 70 (also called Sensor A), a second sensor 60 (also called Sensor B) along with a controller 40 for controlling the pump (and any valves amongst conduits or other parts of the apparatus; along with electrical and electronic components for controlling, signaling, recording, data storage and data transmission.

Referring to FIG. 1 housing 18 comprises a tubular pocket—or trap fitting 24, that extends inwardly from the housing exterior surface and is shaped to receive the small diameter end 27 of trap 26, as indicated by the dashed line. After use, the trap may be easily removed from the trap fitting so laboratory analysis can be performed on the air constituents which were captured during use. Trap fitting 24 may be considered as being a holder for trap 26. Suitable seals between the trap and fitting may be employed.

A trap is a device which captures from air or gas that is passed through a gas or vapor constituent of the fluid or a solid that is carried by the gas or vapor, e.g. suspended particles. That which is captured by a trap is sometimes referred to herein as the capture-constituent.

Exemplary trap 26 is a commercial sorbent tube device, the body of which is hollow-tube like and filled with adsorbent media. During use, air is drawn into the open free end of the trap, as indicated by arrow A. The air is then drawn out the open discharge end of the trap, which is within trap fitting 24. The trap interior surface is covered with a layer of absorbent substance which captures VOC that are carried in air which is flowed through the trap. An exemplary trap is described in more detail below. An adapter may be used with a trap to fit the trap fitting 24; when that is the case, for purposes of the claims herein the adaptor shall be considered part of the trap.

The FIG. 1 sampler embodiment is configured for sampling the ambient air atmosphere. In other embodiments of the invention, air or other gas may be drawn from some other device, for instance, from an interior of a domestic heating furnace. A reference to ambient atmosphere/environment is general reference to a source that is external to the invention apparatus, e.g. to portable sampler 20.

Referring to FIG. 1 and FIG. 2, in an embodiment of sampler, pump 28 is a battery powered diaphragm pump. Pump 28 pulls air into and through the trap while the trap is in the trap fitting, past a sensor port 42, and into conduit 30 that runs to the pump. The pump flows air through conduit 32 to discharge port 34 so the air re-enters the ambient atmosphere of the sampler 20, as indicated by arrow B. A conduit may be a pipe, tubing, hose or the like element for flowing gas. In other embodiments not shown, the pump may discharge air within the housing, enabling the air to flow through a grating back to the ambient environment. The flow rate of the pump may be changed by changing the speed of the pump motor. Speed may be changed by means of an electric speed controller (not shown) which may be integrated within controller 40. Or the pump speed may be changed by use of a manually operated knob, button or the like (not shown) that is mounted on the housing exterior.

Figure 4:
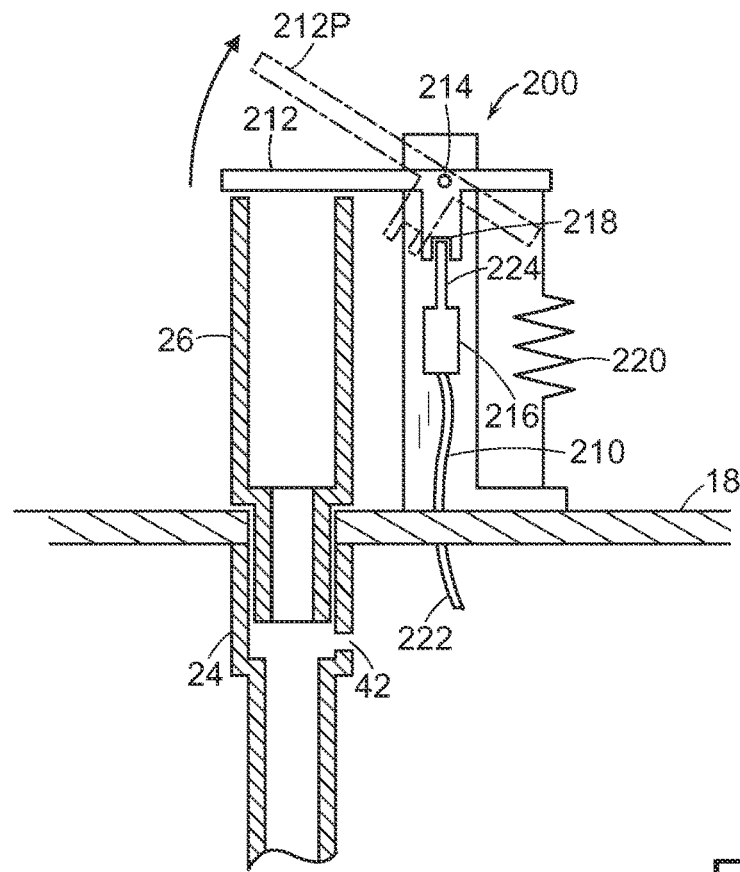
FIG. 4 is a side elevation part-cross sectional view of a mechanism for holding and removing a lid from the inflow end of a trap.

As the air flows from the trap to the pump it passes by port 42, which is located between the upstream end of conduit 30 and the terminal end of the small end of the trap as it sets within the trap fitting. If the trap fitting is deeper than the length of the trap it contains, then port 42 may be at near the outflow end of the trap fitting. See. FIG. 4 Optionally, port 42 may be in conduit 30, close to the pump intake. In some embodiments of the invention, sensor 60 might optionally be downstream of the pump, for example, if there is no need for temperature and pressure measurement of the air passing through the trap.

The apparatus uses an article which comprises an element which interacts with the surrounding environment and a connected larger electronic circuitry portion that activates the element and sends a sensor signal to the controller. In the drawings herein, a sensor is represented as a "black box" from which extends an (electric) line, with the sensing element at the end thereof. Thus, the functional location of a sensor is the location of the sensing element, which is at the end of the line running from the black box.

In an embodiment of sampler 20, the pump is only started when the external sensor (e.g. first sensor, sensor 70) detects that a constituent, such as TVOC or carbon monoxide in the ambient atmosphere has reached a desired threshold, or an ambient atmosphere property, such as temperature, humidity, or pressure is at a desired level. In an embodiment of sampler 20, the pump operation or flow rate (pumping speed) may be controlled as a function of what is detected by the in-conduit sensor (e.g. second sensor, sensor 60).

In an embodiment of sampler 20, sensor 60 measures the level of TVOC, temperature, atmospheric pressure, and water vapor (hereafter "humidity"). An exemplary sensing device, a Bosch BME680 device, is described below. Data from sensor 60 is transmitted to controller 40 which comprises a microprocessor for use in handling data and controlling the pump, including those functions specifically referred to in this description.

Sensor 70 (also marked with the letter A) is separately situated and functioning with respect to the components on the flow path of the pump. Sensor 70 is positioned at port 38, which is an opening to the ambient atmosphere on the exterior surface of the housing. In an embodiment of the invention, sensor 70 is the same kind of device as sensor 60. It thus can measure the level of TVOC, temperature, atmospheric pressure, and humidity, sending the acquired data to controller 40. Temperature and pressure are "parameters (properties)" of the air, whereas humidity (moisture content) and VOC are "constituents" of the air. In alternative embodiments, either sensor may have different, or more, or less, constituent or parametric measuring capacities.

Thus, it will be appreciated that sensor 70 measures the characteristics of air that is being drawn into trap 26, without interfering with the easy removal and replacement of such trap. Sensor 60 measures the characteristics of the air as it likely has been altered in composition because the absorbent substance "grabbed" the VOC as the air passes through the trap. (Of course, if the trap is saturated or otherwise non-functional, then there will be no alteration in air composition—which is likely important for a user to know. Such event would desirably be transmitted to a remotely located user by wireless communication.)

Controller 40, the pump, and the sensors are powered by electric energy from rechargeable electric storage battery power supply 50. Alternatively, in some embodiments where appropriate, the power supply may be external to and/or spaced apart from the housing. Familiar data storage medium (optionally removable), optional devices for data communication, wireless or otherwise, are generally indicated as components 44. An air sampler of the present invention may include familiar elements such as electric power ports, data ports, on-off switches, indicator lights, circuit protection features, electric accumulators, a battery charger, displays (e.g. battery level), signals (e.g. an audible or visual alarm), and so forth. As applies, those elements may be provided on the housing exterior surface and or its cover.

Figure 3:
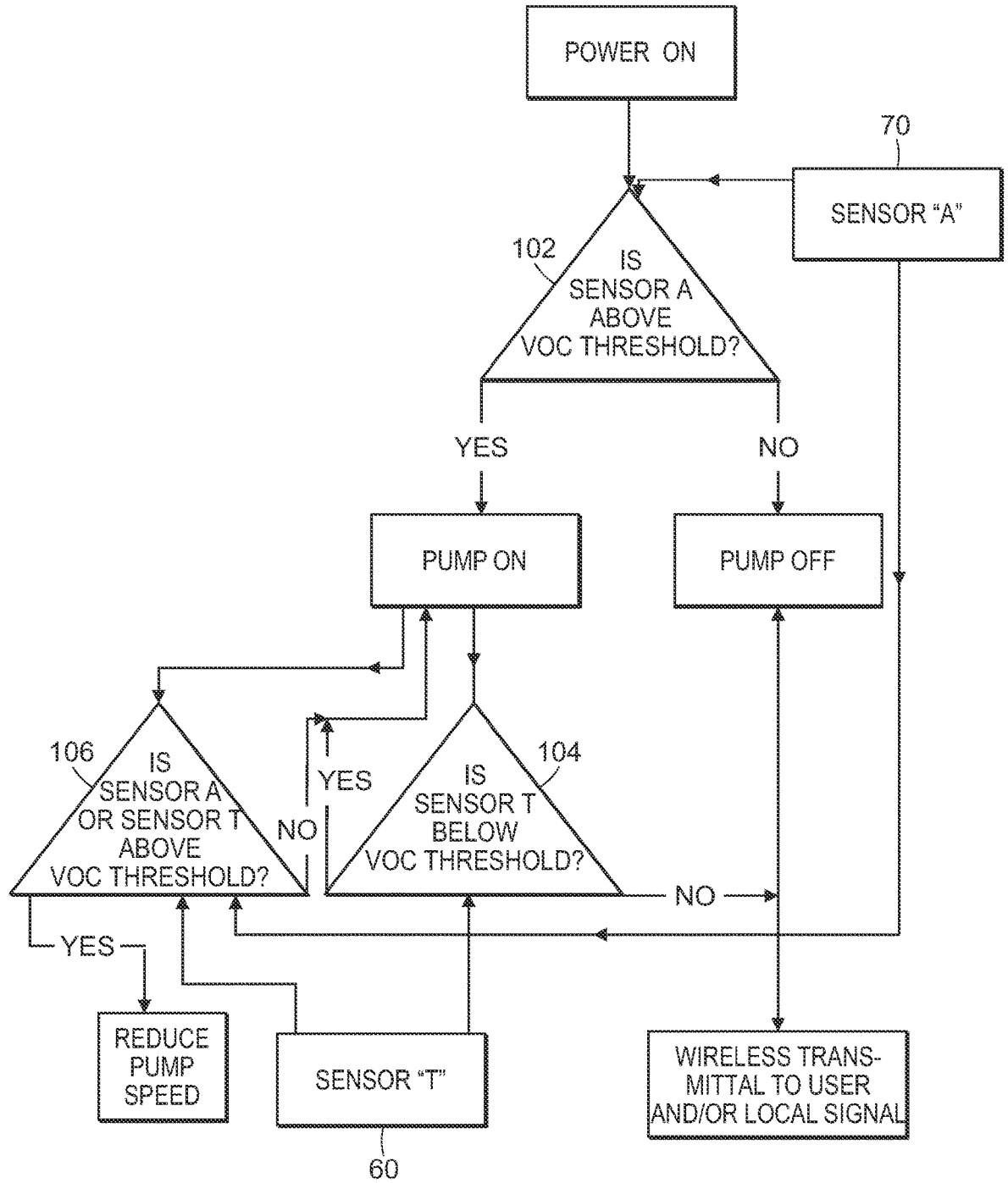
FIG. 3 is a schematic diagram showing an embodiment of the function and interrelation amongst the components of the FIG. 1 system.

In context that the following is illustrative of embodiments of the invention, and therefore is not limiting, FIG. 3 diagrammatically shows some functions of which sampler 20 is capable. After powering the microprocessor of the controller, the signal from first sensor 70 (sensor A) is analyzed to determine if the ambient amount of TVOC is greater than a predetermined threshold value, $L_{VOC}$, which warrants flowing air through the trap. See diagram block 102. If the answer is negative (no), the pump remains off. If the answer is affirmative (yes), the pump is powered on, to draw air through the trap. In an alternative example, whether the pump is turned on might be based on whether or not the temperature or ambient humidity is above a threshold value.

Suppose now that the pump is on. The signal from the second sensor 60 (sensor T) is analyzed along with the signal from the first sensor 70, to determine if the amount of TVOC from sensor 60 is significantly less than (i.e., from about 1 to about 10 percent less than) the amount of TVOC from sensor 70. See diagram block 104. (A "yes" indicates the trap is functioning as intended. A "no" indicates that the trap is saturated or otherwise non-functional.) If yes, the pump is allowed to continue running. If no, the pump is stopped. That event optionally actuates an alarm signal such as a light, is otherwise displayed, or the occurrence of the event is wirelessly transmitted to the user at a remote location. Alternatively, if the amount of TVOC indicated by sensor 60 is below a threshold (e.g., below the sensor 70 value or below a predetermined value programmed into the microprocessor of the controller), that data and the time of occurrence can be simply recorded in memory.

Suppose again, the pump is on. The level of signal from both sensor 60 and sensor 70 is analyzed to see if either one is above a pre-determined threshold, $L_{VOC}$. (A "yes" could indicate that the capacity of the trap to adsorb VOC from the through-flow or air could be, or is being, exceeded.) If yes, the speed and thus the flow rate of the pump is reduced. If no, the pump operation is unchanged. See diagram block 106.

An apparatus comprising the interconnected components described above that are not contained within a housing 18 for easy portability is within the contemplation. For example, if the system is used with a domestic or residential HVAC unit, there may be no need for portability and the interconnected components can be arranged with other sensing and control components of the HVAC system.

The sequence in which air flows through the components of the system may be varied, while accomplishing the same objectives as in another embodiment. For example, as shown by the dashed block in FIG. 2, sensor 60 (sensor T) may be alternatively located downstream of the pump. In another arrangement of components, shown in the schematic diagram of FIG. 5, trap 426 may be located downstream of pump 428; second sensor 460 (sensor T) is located downstream of the trap; and first sensor 470 is upstream of the pump, connected to a line that is within a housing 418. A possible disadvantage of having a second sensor in the conduit downstream of the pump is that there could be heating of the air during passage through the pump.

An exemplary trap 26 is of the sorbent tube type. A typical sorbent tube type trap will be made of chemically inert polymer, glass tubing or stainless steel. It has a length of 88 mm and a barrel diameter of about 6 mm and is about 80-90 mm in length. A smaller 4 mm diameter tubular tip extends from the end of the barrel, for insertion into a receiving port of a sampler or other device. Contained within the tube is media, such as ceramic or charcoal granules in combination with VOC adsorbent material such as Tenax® porous polymer adsorbent (Buchem B. V., Apeldoorn, The Netherlands).

An exemplary sorbent tube type trap is a Supelco Analytical Orb-32 trap (Sigma Aldrich Co., Bellefonte, Pennsylvania). When compounds in air have been collected within the device of over time, trap 26 is removed from trap fitting 24 and taken to a laboratory where the gathered VOC is analyzed.

Other types of traps may be used in practice of embodiments of the invention. For example, use may be made of impingers, also known as bubblers. Impingers are tubes that contain an absorbent liquid which captures compounds such as VOC. After exposure, the liquid is analyzed in a laboratory. For example, use may be made of fibrous filter elements that are typically coated or treated with adsorbent substances, such as SKC Coated Filters (SKC, Eighty Four, Pennsylvania). A multiplicity of like or dissimilar filter elements may be contained with a cassette or housing, that is connected to the trap fitting. After exposure, the filter elements are processed in a laboratory to enable analysis of the captured substances.

In the generality of the invention, a trap fitting is a fitting configured for connecting a trap to the portion of the system which comprises the pump. Other fittings and means than a trap fitting having the configuration of component 24 may be used. For example, a trap fitting may comprise a flange on the surface of the housing, a length of hose, associated adapters and holding devices, and so forth.

An exemplary device that may be used as sensor T (sensor 60) and as sensor A (sensor 70) is a Bosch BME680 Sensortec device (Bosch Sensortec GmbH, Reutlingen, Germany). A BME680 device contains a small MOX (metal oxide) sensing element. As an example, when heated during use, the metal oxide changes resistance based on the amount of TVOC in the air to which the sensor is exposed. A BME680 device is said to be capable of measuring humidity with ±3% accuracy, barometric pressure with ±1 hPa absolute accuracy, and temperature with ±1.0° C. accuracy.

An exemplary pump is a Model SC3101 pump (Skoocom Electronic Co. Ltd, Guangdong, China), which has a variable flow rate between 150 and 600 ml/min, and is rated for providing −20 kPa intake pressure and 30 kPa outlet pressure, rated at 0.5 watts. The miniature size pump has maximum external dimensions of about 18 mm×8 mm×33 mm and an inlet port diameter of about 1.2 mm. Other and different kinds of pumps may be used, including those that are physically larger and that provide lower or higher flow rates or pressures.

The present invention may be used with traps that capture suspended particulates. For example, a trap comprising a fibrous or foam filter element having a fine pore-size. Particulates which could be of interest are airborne organic and inorganic micro-particles, including such as sand, soot, fungi and the like. A particulate trap would be coupled to the trap fitting. As mentioned above, certain kinds of fibrous commercial filters that are treated to adsorb compounds could also collect particulates.

The humidity level during the sampling can greatly affect the weight of the filter. Some membrane filters are sensitive to high humidity due to the hydrophobic nature of the membrane material. Also, certain filters such as those made of mixed cellulose ester (MCE) material are configured to be weighed before and after use to ascertain the amount of particulate matter that has been captured. When humidity causes significant weight addition to the trap during use, easily achieving the objective can be confounded. So, for example, when the invention apparatus has such a moisture sensitive trap, if the humidity sensed at internal conduit second sensor 60 is lower than the humidity from external first sensor 70, that will indicate the filter is "taking on water;" and the controller will stop the pump, at least until the humidity drops. Analogously, a filter that was made of substance which took up VOC, when doing so was not an aim of the sampler use, would trigger a cessation of pumping when the air flowing from the trap had lower TVOC content than the ambient air.

In another embodiment of the invention, the input end of the trap is blocked or covered to prevent interaction with, and possible contamination by, the ambient air, prior to a desired collection time. Just before, or simultaneously with, the pump starting to pull or push air through the trap, the input end of the trap is opened.

Exemplary apparatus having a removable lid closure 212 (valve) on a sorbent trap is shown in FIG. 4. The inflow end of trap 26 is set within trap fitting 24 of housing 18 is covered by a lid 212 that rests on the free end of the trap. Lid 212 pivots about pin 214 at the upper end of stanchion 210, which that is fastened to the surface of housing 18. The lid pivots to an open position shown by phantom 212P. Shaft 224 of solenoid 216 acts as a latch, engaging the slotted end of leg 218 that is integral with the lid structure. When the lid is closed, latch 224 holds it so. When the solenoid is commanded by controller 40 (to which it is connected by power line 222), the latch 224 pulls away from its mating with the leg; and, tension spring 220 causes the lid to open. Thus, lid 212 is a valve. In an alternative embodiment, the lid is opened and closed manually.

Figure 5:
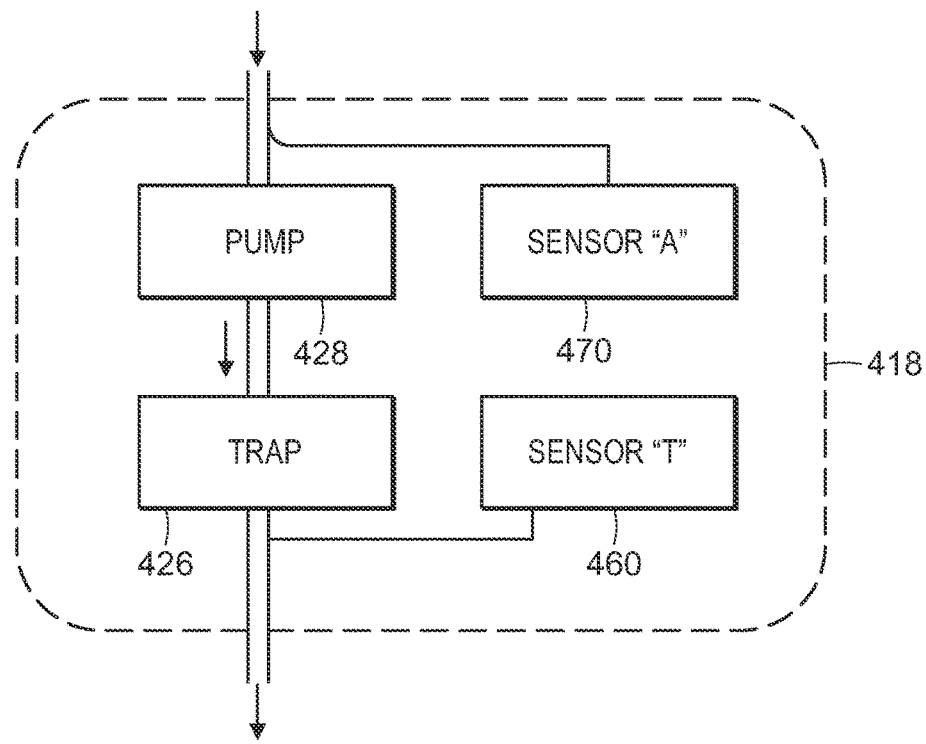
FIG. 5 is a schematic diagram showing a sampler with an alternative arrangement of pump, trap and sensors.
Figure 6:
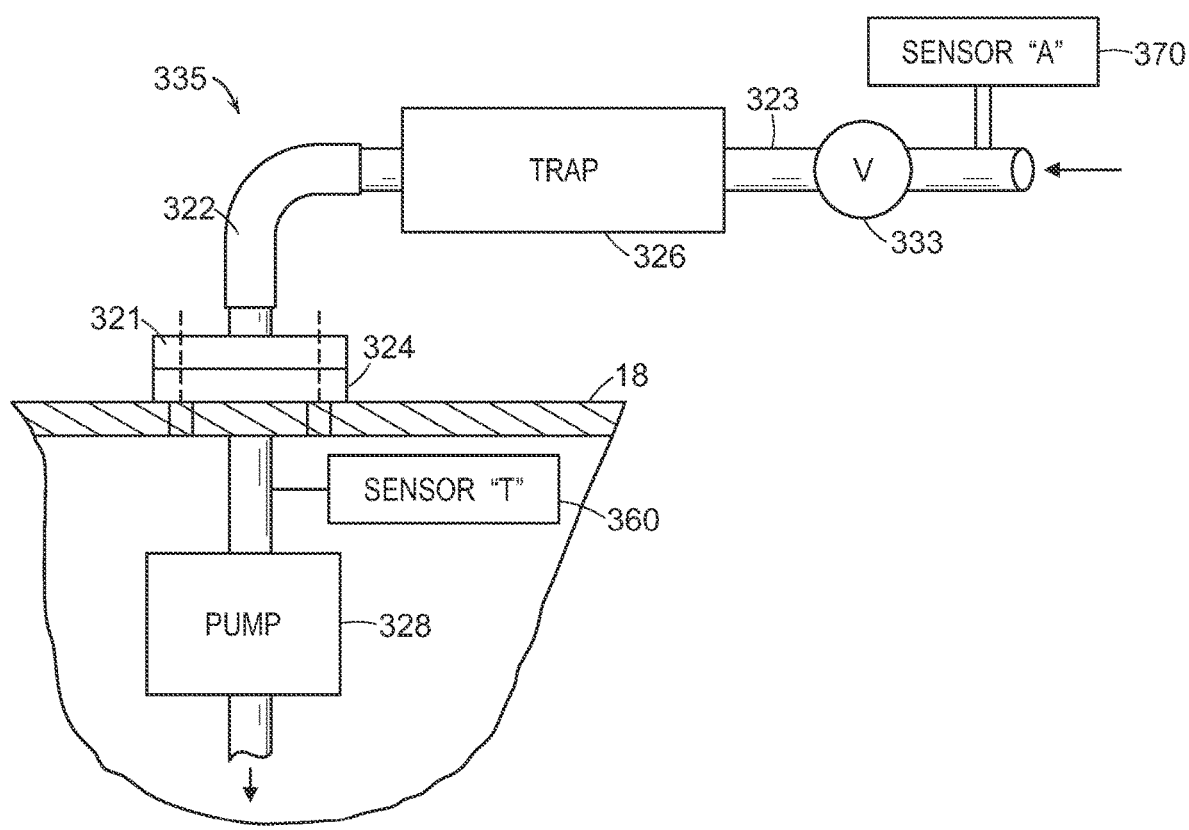
FIG. 6 shows a portion of a modified system, similar to that of FIG. 1, having a trap attached by a hose to a housing and a solenoid valve controlling entry of gas to the trap.

FIG. 5 shows a portion of another exemplary apparatus, one which comprises a valve/closure that is configured to enable one or both keeping the trap protected prior to sampling, and protecting the trap interior after air has been drawn through the trap. The apparatus shown in FIG. 5 is largely like that which is shown in FIG. 1. Housing 18 has a trap fitting 324 that is a flange. Adapter 335 comprises fitting 321 that mates with the flange 324 and hose 322 that runs to the inflow end of trap 326. The outflow end of the trap runs to solenoid valve 333 by means of line 323. In this embodiment, instead of being in the housing sensor A 370 is on the inflow conduit that runs to valve 333. Operation of electric valve 333 is effected by a power line running to the controller (not shown). In an example of operation of the FIG. 5 embodiment, valve 333 is opened by the controller just before or simultaneously with the time when the pump causes air to flow through the apparatus, including the trap.

When airflow ceases, the valve is closed. In the generality of this aspect of the invention, a valve may be controlled electrically or manually.

The invention meets the objectives of the invention in enabling programmed control of the operation of the air pump. For instance, the invention enables that start of flow of air through the trap when the ambient air sensor detects a parameter, e.g., TVOC, is above zero or a threshold level, whether or not a user is present. For instance, the invention enables flow of air through the trap only when a parameter, e.g., temperature or humidity, is greater than X and less than Y. With wireless connectivity, a user can monitor conditions and performance remotely.

The present invention has other diverse uses: It enables a scientist to correlate the release of certain compounds by plants with particular temperatures and humidity conditions; it enables study of release of VOC within a headspace chamber containing plants or animals, and the like. In the field, a researcher can correlate air pollution level (e.g. the level of VOC) with temperature or humidity on microsite (very local) scale. Other areas of applicability include: Other applications can include material emissions, landfill gas monitoring, agricultural VOC from pesticides, vapor and gas intrusion into buildings and related sub-slab measurements, soil gas testing, environmental rehabilitation, dealing with disease biomarkers.

In connection with residential and commercial well-being of occupants, wherein the character of air circulated by a heating ventilating and air conditioning (HVAC) system is monitored; in industrial hygiene, wherein a worker's local environment is monitored. The invention may be particularly useful with respect to the air which is being recirculated during operation of a HVAC system. For example, in the system of exemplary apparatus 20, sensor 70 would be positioned within the recirculating air, for example upstream or downstream of a heating or cooling unit. The sensor would be configured to detect a parameter, such as TVOC or carbon monoxide; and when that parameter was above a certain pre-determined threshold value, the pump would be commanded to start and thereby flow air through the trap. Subsequently, the trap can be removed and analyzed for airborne compounds that accompanied the rise in the value of the parameter.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus, embodiments lacking any such preferred feature or combination may be within the scope of the claims which follow. Persons skilled in the art may make various changes in form and detail of the invention embodiments which are described, without departing from the spirit and scope of the claimed invention.

That which is claimed is:

1. Apparatus for drawing air into a trap from the ambient environment or other gas domain, comprising:
    a trap fitting;
    a trap, having an inflow end and an outflow end, configured to capture Volatile Organic Compounds (VOC) from air flowing there-through;
    a pump, in flow communication with the trap, for flowing air from the ambient environment or other gas domain through the trap and for flowing air that has flowed through the trap to the ambient environment or other gas domain;
    a first sensor, for generating a first sensor signal responsive to the Total Volatile Organic Compound (TVOC) content of air;
    a second sensor, for generating a second sensor signal responsive to the TVOC content of air;
    a controller, configured at least for selectively actuating the pump to move air through the trap responsive to one or both said first sensor signal and said second sensor signal; and
    a power supply, for powering said controller, pump, and sensors;
    wherein the trap is connected to or positioned within the trap fitting;
    wherein the first sensor is in fluid communication with air of the ambient environment or other gas domain upstream of the inflow end of the trap;
    wherein the trap fitting is in flow communication with the pump by means of a first conduit; and,
    wherein the second sensor is in fluid communication with air that flows from the trap outflow end and through the first conduit, wherein the controller is further configured to only flow air through the trap when the first sensor signal indicates a greater amount of TVOC than does the second sensor signal; and
    wherein the controller is further configured to only flow air through the trap when the first sensor signal indicates a greater amount of TVOC than does the second sensor signal.

2. The apparatus of claim 1 further comprising: a valve upstream of the inflow end of the trap, for selectively blocking air from entering the inflow end of the trap; wherein the valve opening is controlled manually or by said controller.

3. The apparatus of claim 2 wherein the valve is open only when the first sensor signal indicates the amount of TVOC is greater than a predetermined threshold and is greater than the amount of TVOC that is indicated by the second sensor signal.

4. A method of determining the amount of Volatile Organic Compounds (VOC) within a quantity of air which comprises:
    providing apparatus of claim 2;
    causing said valve to open and running the pump to flow air through the trap when the first sensor signal indicates the amount of Total Volatile Organic Compounds (TVOC) is greater than a predetermined threshold value; and
    removing the trap from the trap fitting and determining the amount of VOC, or the components of the VOC, which were captured by the trap.

5. The apparatus of claim 1 further comprising: a device for storing sensor signal data and other data from the controller; and, a device for communicating sensor signal data and other data from the controller wirelessly to receiving devices remote from the apparatus.

6. Apparatus for drawing gas into a trap from the ambient environment or other gas domain, comprising:
    a trap fitting;
    a trap, having an inflow end and an outflow end, configured to capture a first gas constituent from gas flowing there-through;
    a pump, in flow communication with the trap, for flowing gas from the ambient environment or other gas domain or other domain into and through the trap and for flowing outflow gas from the trap to the ambient environment or other gas domain;

a first sensor, for generating a first sensor signal responsive to the amount of the first gas constituent in gas;

a second sensor, for generating a second sensor signal responsive the first gas constituent content in gas;

a controller, configured at least for selectively actuating the pump to move gas through the trap responsive to one or both said first sensor signal and said second sensor signal; and a power supply, for powering said controller, pump, and sensors;

wherein the trap is connected to or positioned within the trap fitting;

wherein the first sensor is in fluid communication with gas of the ambient environment or other gas domain upstream of the inflow end of the trap;

wherein the trap fitting is in flow communication with the pump by means of a first conduit; and, wherein the second sensor is in fluid communication with gas that flows from the trap outflow end and through the first conduit;

wherein the controller is further configured to command the pump to change the rate at which the pump flows air through the trap responsive to one or both said first sensor signal and said second sensor signal; and wherein the controller is further configured to only flow air through the trap when the first sensor signal indicates a greater amount of first constituent than does the second sensor signal;

wherein the controller is further configured to only flow air through the trap when the first sensor signal indicates a greater amount of first constituent than does the second sensor signal.

7. Apparatus for drawing gas into a trap from the ambient environment or other gas domain, comprising:

a trap fitting;

a trap, having an inflow end and an outflow end, configured to capture a first gas constituent from gas flowing there-through;

a pump, in flow communication with the trap, for flowing gas from the ambient environment or other gas domain or other domain into and through the trap and for flowing outflow gas from the trap to the ambient environment or other gas domain;

a first sensor, for generating a first sensor signal responsive to the amount of the first gas constituent in gas;

a second sensor, for generating a second sensor signal responsive the first gas constituent content in gas;

a controller, configured at least for selectively actuating the pump to move gas through the trap responsive to one or both said first sensor signal and said second sensor signal; and a power supply, for powering said controller, pump, and sensors;

wherein the trap is connected to or positioned within the trap fitting;

wherein the first sensor is in fluid communication with gas of the ambient environment or other gas domain upstream of the inflow end of the trap;

wherein the trap fitting is in flow communication with the pump by means of a first conduit; and, wherein the second sensor is in fluid communication with gas that flows from the trap outflow end and through the first conduit;

wherein the controller is further configured to command the pump to change the rate at which the pump flows air through the trap responsive to one or both said first sensor signal and said second sensor signal; and wherein the controller is further configured to only flow air through the trap when the first sensor signal indicates a greater amount of first constituent than does the second sensor signal;

wherein the controller is further configured to only flow air through the trap when the first sensor signal indicates a greater amount of first constituent than does the second sensor signal;

wherein the valve is open only when the first sensor signal indicates the amount of first constituent is both greater than a predetermined threshold and greater than the amount of first constituent that is indicated by the second sensor signal.

8. A method of determining the amount of a first gas constituent within a quantity of gas which comprises: providing apparatus for drawing gas into a trap from the ambient environment or other gas domain, comprising:

a trap fitting;

a trap, having an inflow end and an outflow end, configured to capture a first gas constituent from gas flowing there-through;

a pump, in flow communication with the trap, for flowing gas from the ambient environment or other gas domain or other domain into and through the trap and for flowing outflow gas from the trap to the ambient environment or other gas domain;

a first sensor, for generating a first sensor signal responsive to the amount of the first gas constituent in gas;

a second sensor, for generating a second sensor signal responsive the first gas constituent content in gas;

a controller, configured at least for selectively actuating the pump to move gas through the trap responsive to one or both said first sensor signal and said second sensor signal; and a power supply, for powering said controller, pump, and sensors;

further comprising: a valve, for selectively blocking air from entering the inflow end of the trap;

wherein opening of the valve is controlled manually or by said controller running the pump to flow gas through the trap, trap fitting, and pump;

comparing the second sensor signal and the first sensor signal and stopping the pump from running or reducing the speed of the pump when the amount of first gas constituent indicated by the second sensor is substantially the same as the amount of first gas constituent indicated by the first sensor; and removing the trap from the trap fitting and determining the amount of first gas constituent, or the components of the first gas constituent, which were captured by the trap.

* * * * *